Nov. 30, 1965  H. W. BARCH ETAL  3,220,818
METHOD AND APPARATUS FOR SUPPORTING GLASS SHEETS
Filed June 7, 1962  2 Sheets-Sheet 1

INVENTORS
HERBERT W. BARCH
JOSEPH D. KELLY and
BY RUDOLPH L. MALOBICKY

Oscar L. Spencer
ATTORNEY

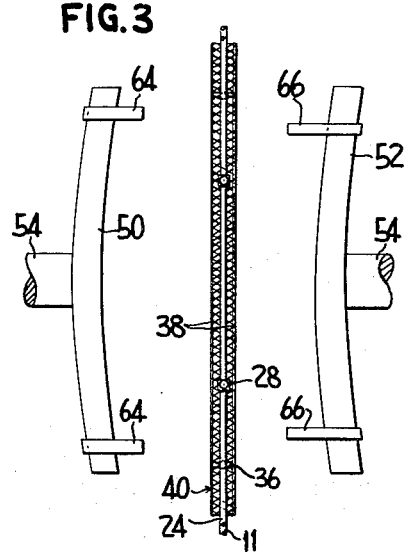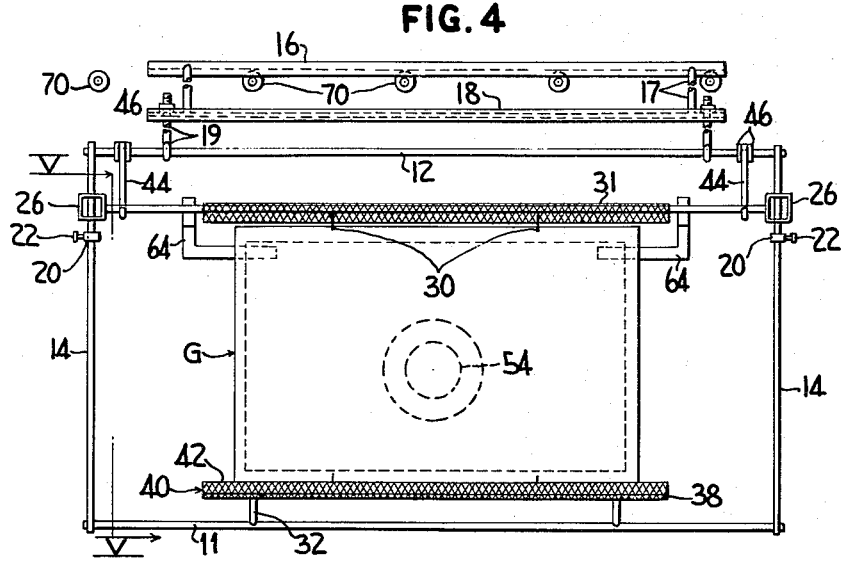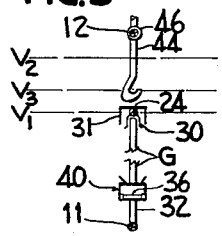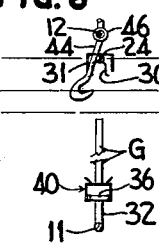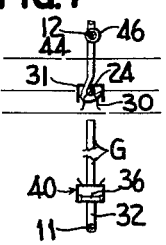

United States Patent Office 3,220,818
Patented Nov. 30, 1965

3,220,818
METHOD AND APPARATUS FOR SUPPORTING GLASS SHEETS
Herbert W. Barch, Natrona Heights, Joseph D. Kelly, Cheswick, and Rudolph L. Malobicky, Tarentum, Pa., assignors to Pittsburgh Plate Glass Company, Pittsburgh, Pa., a corporation of Pennsylvania
Filed June 7, 1962, Ser. No. 200,763
7 Claims. (Cl. 65—106)

This invention relates to method and apparatus for supporting glass sheets and relates to a method of balancing a glass sheet in a substantially vertical plane during a tempering operation, particularly one in which a glass sheet is first shaped between complementary shaped glass pressing members and subsequently tempered.

In the past, glass sheets have been bent between complementary pressing members by suspending the glass in a vertical plane by means of tongs which grip the glass between opposed tong points near the upper edge thereof. Optical defects resulting from the penetration of the tongs into the heat-softened glass and distortions resulting from the tendency of the tongs to pivot into a vertical plane in which they hang freely after the heat-softened glass sheet is shaped to have an inclined upper edge have caused the glass bending art to seek other ways of supporting the glass sheets while subjected to press bending.

The prior art has proposed to support the bottom edge of a glass sheet on a bottom edge support member and to balance the glass by means of hairpin-like members or wire clips which engage the glass sheet at its upper edge. U.S. Patent No. 2,263,005 to McClure shows this proposal.

The prior art also suggests supporting the bottom edge and top edge on spaced pivotable support elements which are capable of moving in response to the bending of the glass sheet to maintain their engagement with the edge of the glass as its vertical dimension is shortened during the bending operation. U.S. Patent No. 2,537,803 to Walters exemplifies this suggestion.

The pressing members of the prior art were notched to provide clearance for the tongs or clips or balancing elements when the glass was pressed into shape. The prior art devices were not completely satisfactory because a slight misalignment between the notches of the glass shaping members and the structural elements which engage the upper edge of the glass sheet to support the latter in a substantially vertical position (i.e., tongs or hairpin-like members or pivotable lugs, etc.) will spoil the shaping surface of the pressing members, or crush the glass engaging members or both. Furthermore, even if the notches in the glass shaping memberse are aligned properly with the glass engaging members, the outline of the notches is imprinted on the surfaces of the glass, thereby spoiling the optical properties of the bent sheet.

The present invention makes is possible to avoid notching the glass shaping members by lifting the glass balancing members above the upper edge of the glass sheet when the glass shaping members contact the major surfaces of the heat-softened glass sheet and to lower the glass balancing members into balancing engagement with the upper edge of the glass sheet when the glass shaping members are retracted after the glass sheet is bent to its desired shape.

Typical apparatus for performing the present invention employs a frame including an upper horizontal member, a lower horizontal member, vertical members rigidly interconnecting the upper and lower horizontal members and an intermediate horizontal member supported by the vertical members in freely sliding relation therealong intermediate the upper and lower horizontal members.

The bottom edge of a glass sheet is supported on a bottom glass edge engaging member provided with a glass supported surface of expanded metal strips making flatwise contact with the bottom edge. The intermediate horizontal member is provided with balancing means extending downward therefrom on opposite sides of the upper edge portion of a flat glass sheet to engage said upper edge portion loosely.

An abutment means is carried by each vertical member for supporting the intermediate horizontal member in a desired lowermost position wherein the balancing means engage the upper edge portion of the glass sheet to balance the glass sheet in a substantially vertical position with the bottom edge supported on the glass supporting surface of flatwise disposed strips of expanded metal preparatory to bending.

Such a glass supporting apparatus has the facility of readily raising the intermediate horizontal member when loading a glass sheet for support in the vertical position and then permitting the intermediate horizontal member to slide to its lowermost position. If the flat glass sheet is to be supported in such a manner for tempering, the facility by which the intermediate member can be moved vertically permits easy loading and unloading of the flat glass sheet before and after the tempering operation.

When the support structure is employed for bending and tempering, the present invention provides cam means operatively connected to at least one of the glass shaping members. The cam means has an upper cam surface located above and inwardly of the shaping surface of the glass shaping member to which it is connected for engaging the lower surface of the intermediate horizontal member and lifting the intermediate horizontal member a sufficient distance to disengage the glass sheet balancing members from the upper glass sheet edge portion in response to movement of the glass shaping members into pressurized contact with the supported glass sheet.

The apparatus of the present invention comprises means for supporting the bottom edge of a glass sheet, vertically movable means carrying means to balance the glass sheet in a substantially vertical position by loosely engaging the upper edge portion thereof, a pair of glass shaping memberse movable toward and away from the opposite surfaces of a glass sheet supported and balanced in alignment therewith by said supporting means and balancing means, and means operatively connected with said glass shaping members for raising said balancing means out of engagement with the upper edge portion of said glass sheet when said glass shaping members move toward a glass sheet supported therebetween and for lowering the balancing means into engagement with the upper edge portion when the glass shaping members move away from the glass sheet.

An alternate illustrative apparatus incorporates relatively short balancing members for engaging the upper edge of the glass sheet for substantially its entire length, relatively long balancing members spaced from one another, all the balancing members being attached to the vertically movable horizontal member, and hook means pivoted to the frame for movement into a position engaging the vertically movable horizontal member to support the latter in a position intermediate its lowermost position where all balancing members engage the top edge of the glass and its uppermost position caused by inward movement of the cam means where all balancing members are disengaged.

To the best of applicants' knowledge, the glass tempering art has failed to provide a glass supporting member with an intermediate horizontal member supported between vertical members in freely sliding relation therealong. U.S. Patent No. 2,618,905 to Dicks and Schultz discloses an intermediate member carrying glass-balancing means thereon that is vertically movable between a series of fixed locations wherein the intermediate horizontal member may be locked in place. In this construction, no free vertical movement of the glass-balancing means is permitted once the location of the intermediate horizontal member is selected. Therefore, the prior art provides no flexibility in position during loading nor movement of the balancing members out of engagement with the upper edge portion of the glass sheet when the glass is rigidly supported in pressurized engagement by the opposing pressure members.

Another important aspect of the present invention is the provision of bottom edge support providing sufficient rigidity to support the glass without sagging and yet sufficiently pervious to air flow to permit air blasts ready access to the glass sheet bottom edge.

An illustrative embodiment of the present invention will now be described in order to facilitate the reader's understanding of the present invention.

In the drawings which form part of the description,

FIG. 3 is a plan view of the device of FIG. 1;

FIG. 4 is a view similar to FIG. 2 of an alternate embodiment of the present invention;

Figure 1:
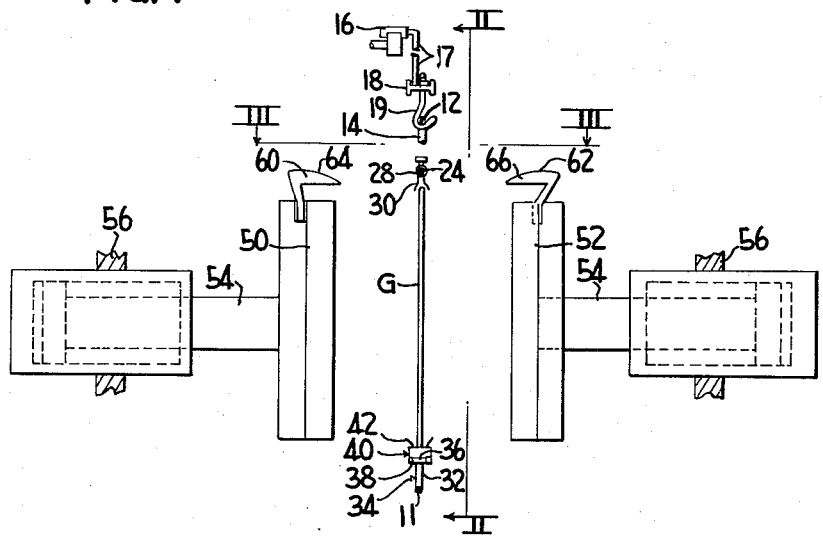
FIG. 1 is a fragmentary sectional view taken along lines I—I of FIG. 2 of a glass supporting structure shown in position between a pair of pressing members.
Figure 2:
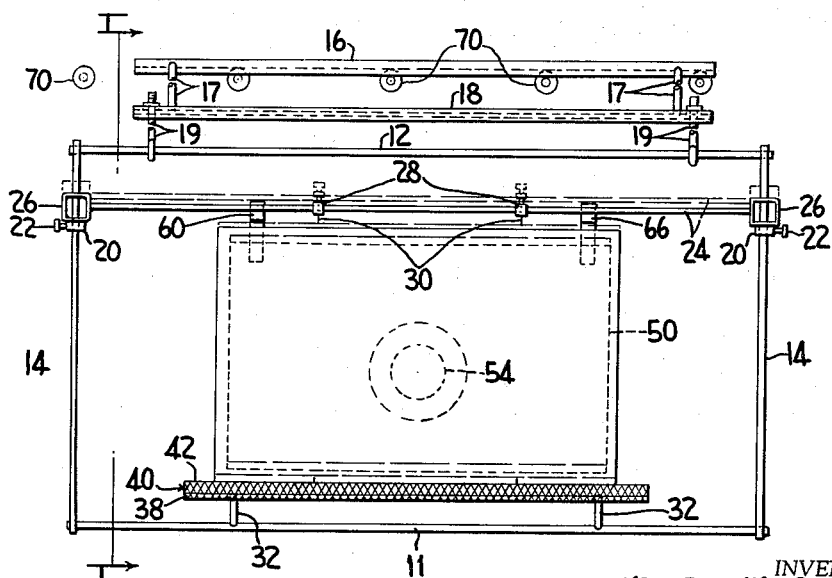
FIG. 2 is a longitudinal elevation of one embodiment of glass support member showing in phantom an alternate position of the movable intermediate horizontal member.

FIGS. 5, 6, and 7 are schematic sectional views along the lines V—V of FIG. 4, showing the relative position of the upper edge balancing members in the initial lower position engaging a flat glass sheet, in the raised position when the glass is being shaped and in the final intermediate position for quenching, respectively.

The apparatus forming the present invention comprises a frame formed by a lower horizontal member 11 and an upper horizontal member 12, rigidly interconnected to one another by means of a pair of spaced vertical members 14 to form a frame. The upper horizontal member is suspended from a sled-like member 16 by means of vertical rods 17, a horizontal connecting H beam 18, and suspended locks 19.

Each of the vertical members 14 is provided with a collar 20 which is slidably mounted therealong and locked in a given position by means of a set screw 22. An intermediate horizontal member 24 comprises a horizontally extending rod having its ends attached to a pair of sleeves 26 loosely mounted for sliding movement in a vertical direction along the vertical members 14. When the sleeves 26 rest on the collars 20, the intermediate horizontal member rests in the lowermost position permitted intermediate the upper horizontal member 12 and lower horizontal member 11. This position is selected in the light of the height of the glass sheet to be supported on said support structure.

Additional sleeves 28 are mounted for longitudinal displacement along the intermediate horizontal member 24 and are provided with hairpin balancing members 30 that extend downwardly in diverging downward relation from their points of attachment to the additional sleeves 28.

A pair of spaced vertical rods 32 are attached to the lower fixed horizontal member 11 of the frame and form the stem of a T-shaped member 34. A horizontal cross member 36 of the T-shaped member 34 interconnects a pair of longitudinal bars 38 which serve as reinforcements of an inverted expanded metal channel member 40 whose flat upper surface 42 serves as a bottom glass edge engaging surface. The surface 42 is preferably of a foraminous metal such as expanded or punched stainless steel having about 80 percent or more of its glass edge supporting surface perforated.

A concave glass shaping member 50 and a convex glass shaping member 52 are provided with complementary shaped glass facing surfaces covered with fiber glass. Their shaping surfaces face the opposite surfaces of a glass sheet G to be shaped therebetween. Each shaping member 50 or 52 is supported for movement by attachment to one of a pair of pistons 54 slidably mounted in a piston housing supported by support structure 56.

A cam 60 is attached to each end of the glass shaping member 50 and an additional cam 62 is attached to each end of the convex glass shaping member 52. Each cam 60 has an upper cam surface 64, while each cam 62 has an upper cam surface 66. The upper surfaces 64 and 66 of the four cams engage the lower surface of the horizontal member 24 to lift the member and its attached hairpin balancing members 30 upwardly when the glass shaping members approach one another.

The sled-like member 16 is supported by a plurality of conveyor rolls 70 which are attached to driving means (not shown) for conveying the frame supporting the glass sheet in a vertical position through a heating furnace where the glass softens to a temperature sufficient for it to be shaped upon pressurized contact between the glass shaping members 50 and 52 in a manner so well known in the art it need not be illustrated herein.

When the glass shaping members approach one another during the shaping operation, the upper surfaces 64 and 66 of the cams lift the vertically movable intermediate horizontal member 24, thereby lifting the attached hairpin balancing members 30 out of engagement with the glass and clearing the path of movement of the shaping members toward one another without requiring clearance notches.

When the glass is held in pressurized contact for about two seconds, the glass is sufficiently shaped to permit the glass shaping members to retract and the intermediate horizontal member 24 permitted to lower to the lowermost position permitted by the collars 20 which serve as stop members defining the lowermost position permitted for the intermediate horizontal member 24. In this position, the shaped glass sheet is again resting with its bottom edge resting upon the glass edge engaging surface 42 of the expanded metal channel member 40 and the upper surface is loosely held between the downwardly extending arms of the hairpin-like members 30.

The glass sheet is then conveyed while so supported on the frame to a quenching station. There, blasts of air are applied under pressure to chill the glass and impose a temper.

An alternate embodiment of the invention is shown in FIGS. 4 to 7. In this alternate embodiment, the hairpin balancing members 30 are relatively long and additional balancing members 31 having a relatively short vertical dimension are attached to the vertically movable horizontal member 24.

The additional balancing members extend lengthwise substantially the entire length of the glass sheets to be shaped and engage the flat glass sheet along substantially its entire length. The relatively long balancing members 30 extend downward in planes transverse to the plane of support for the flat glass sheet. The planes occupied by the clips intersect the lines of intersection between the curved upper edge of the glass sheet after bending and the initial plane of support for the flat glass sheet.

A pair of hooks 44 are pivotally suspended from the upper horizontal member 12 of the glass supporting frame. A pair of spaced discs 46 are fixed to member 12 to restrict the axial movement of each hook 44 lengthwise of member 12. The hooks 44 are constructed of such length that they are capable of engaging vertically movable member 24 and supporting the latter in plane $v_3$. The latter plane is intermediate plane $v_1$, which member 24 occupies when sleeves 26 rest on collars 20 when the flat glass is first loaded and plane $v_2$, which the movable member 24 occupies when lifted by the cam surfaces 64 and 66.

In this embodiment, the glass sheets are loaded into the frame for support in a vertical position as in the first embodiment, the only difference being that the hooks 44 must be disengaged from the movable member 24 when the glass is first loaded to permit the movable member to be lowered to plane $v_1$. When the cam surfaces lift member 24 to plane $v_2$, the freely rotatable hooks 44 pivot by gravity into positions beneath member 24 and are in position to support the latter in plane $v_3$ when the glass shaping members separate from one another. They sustain member 24 in plane $v_3$ during quenching. Thus, only the relatively long balancing members 30 engage the top edge of the bent glass to balance the latter and allow access of air to quench its top edge.

It is essential that the bottom edge supporting members 40 be composed of foraminous metal. Expanded stainless steel plate of 22 gauge (about $\frac{1}{32}$ inch thick) with about 50 percent or more open area has sufficient rigidity to support plate glass sheets $\frac{1}{4}$ inch thick up to 30 inches high during the heating cycle. Sheets of criss-crossing strips $\frac{1}{8}$ inch wide forming diagonal openings having a width of $\frac{7}{8}$ inch in the long dimension and $\frac{1}{4}$ inch in the narrow dimension are preferred to support the bottom edge of the glass sheet and to permit easy access of the air streams during quenching. Such an expanded metal construction does not have sufficient thermal capacity to retard the heating and the subsequent cooling of the bottom edge of the glass sheet to such an extent as to establish a tension stress rather than a compression stress in the bottom edge portion supported thereon during the bending and tempering operation.

The bottom edge support structure of the present invention should preferably have the following characteristics:

(1) an upper surface of strips of sufficient width to make flatwise contact with the bottom edge surface of the glass sheet over a sufficiently wide area to minimize localized pressures tending to penetrate into the glass at tempering temperature. A minimum width of about $\frac{3}{32}$ inch is needed for glass sheets $\frac{1}{4}$ inch thick and 2 feet high;

(2) the space between strips should provide an apertured portion of at least about 50 percent of the area of the bottom edge support surface to facilitate exposing the bottom edge to both heating atmosphere and quenching fluid to the maximum extent;

(3) the strips should be sufficiently thick to support the mass of glass without deformation throughout the temperature cycle;

(4) the material should preferably be of a composition that does not react chemically with the glass, does not oxidize, and does not lose its mechanical rigidity throughout the heating and quenching cycle. Stainless steel is preferred, but other refractory materials may be employed;

(5) the strips should preferably extend diagonally across the supported bottom edge.

The area of the glass shaping members contacting the glass sheets is smaller than the outline of the glass sheet to be bent so as to expose the margin of the glass during the pressing operation. This helps avoid contact between the glass shaping members and the glass supporting and glass balancing members when the glass is shaped. It also improves the optical properties of the bent glass sheet. This aspect of the present apparatus is not part of the present invention, but is incorporated in an invention of Harold E. McKelvey, described and claimed in another patent application.

The form of the invention shown and described in this disclosure represents an illustrative preferred embodiment thereof. It is understood that various changes may be made without departing from the spirit of the invention as defined in the claimed subject matter which follows.

What is claimed is:

1. A method of supporting flat glass sheets having upper and lower edges and opposing major flat surfaces during bending comprising supporting a flat glass sheet at its bottom edge on a rigid bottom edge support while loosely engaging said sheet along its upper edge portion with balancing means to balance said sheet in a substantially vertical position, heating said sheet while so supported and balanced to substantially its deformation temperature, moving complementary shaping members toward one another into contact with the opposite flat major surfaces of said heated glass sheet until said sheet is in pressurized contact with said shaping members; and, as said shaping members move into pressurized contact with said sheet, moving said upper edge balancing means upwardly out of engagement with the upper edge of said sheet, maintaining the shaping members in pressurized contact against the heat-softened glass sheet surfaces as the glass sheet assumes the shape of the complementary shaping members, withdrawing the shaping members from the shaped glass sheet and, immediately lowering said upper edge balance means to reengage loosely the upper edge of the shaped sheet while the lower edge thereof is supported on said bottom edge support, and immediately cooling the shaped glass sheet while so supported to below its deformation temperature.

2. Apparatus for supporting a glass sheet in a substantially vertical position during bending comprising a frame including an upper horizontal member, a lower horizontal member, and spaced vertical members rigidly interconnecting said upper and lower horizontal members, an intermediate horizontal member supported for vertical movement between said vertical members intermediate said upper horizontal member and said lower horizontal member, abutment means carried by each said vertical member for supporting said intermediate horizontal member in a lowermost position, a bottom glass edge engaging member attached to said lower horizontal member, and balancing means extending downward from said upper horizontal member on opposite sides of the upper edge portion of a flat glass sheet to loosely engage said upper edge portion when said flat glass sheet is supported at its bottom edge on said bottom glass edge supporting member, glass shaping members having complementary shaping surfaces adapted to apply pressure to the opposite major surfaces of a heat-softened glass sheet supported within said frame, and cam means operatively connected to at least one of said glass shaping members and having an upper cam surface located above and inward of the shaping surface of said glass shaping member to which it is connected for engaging the lower surface of said intermediate horizontal member and lifting said intermediate horizontal member a sufficient distance to disengage said balancing means from said upper glass sheet edge portion in response to movement of said glass shaping members into pressurized contact with said supported glass sheet.

3. Apparatus for bending glass sheets comprising a frame, means attached to said frame for supporting the bottom edge of a glass sheet, a vertically movable member supported for free vertical movement within said frame, means carried by said vertically movable member to balance said glass sheet in a substantially vertical position by loosely engaging the upper edge portion thereof, a pair of glass shaping members movable toward and away from the opposite surfaces of a glass sheet supported and balanced in alignment therewith by said supporting means and balancing means, and means operatively connected with said glass shaping members for raising said balancing means into a raised position out of engagement with the upper edge portion of said glass sheet when said glass shaping members move toward a glass sheet supported therebetween and for lowering said balancing means into a lowered position in engagement with said upper edge portion when said glass shaping members move away from said glass sheet.

4. Apparatus as in claim 3, further including hook means carried by said frame and pivotable into a position to support said balancing members in a position intermediate the raised position and the lowered position, said balancing means comprising a pair of spaced hairpin-like members attached to and extending downward from said vertical movable member a relatively large vertical distance in spaced vertical planes on opposite sides of said vertically movable member a relatively large vertical pair of vertical walls of expanded metal attached to and extending downward a relatively small vertical distance from said vertically movable member in spaced vertical planes on opposite sides of said vertical position occupied by said glass sheet.

5. Apparatus for supporting a glass sheet in a substantially vertical position comprising a frame, means attached to said frame for supporting the bottom edge of the glass sheet, said means having a flat glass supporting surface of expanded metal disposed in flatwise engagement with the bottom edge surface of the glass sheet, a vertically movable member supported for free vertical movement within said frame, and balancing means carried by said vertically movable member for balancing the glass sheet in a substantially vertical position by loosely engaging the upper edge portion thereof, said balancing means comprising a pair of spaced hairpin-like members attached to and extending downward from said vertically movable member a relatively large vertical distance in spaced vertical planes on opposite sides of said vertical position occupied by said glass sheet and a pair of vertical walls of expanded metal attached to and extending downward from said vertically movable member a relatively small vertical distance in spaced vertical planes on opposite sides of said vertical position occupied by said glass sheet.

6. Apparatus for supporting a glass sheet in a substantially vertical position comprising a frame, means attached to said frame for supporting the bootom edge of said glass sheet, a vertically movable member supported for vertical movement within said frame, means carried by said vertically movable member to balance said glass sheet in a substantially vertical position by loosely engaging the upper edge portion thereof, and means operatively connected to said vertically movable member to raise said member into a position wherein said balancing means are disengaged from said upper edge portion and to lower said member into a position wherein said balancing means loosely engage said upper edge portion.

7. Apparatus as in claim 6, wherein said balancing means comprises a pair of spaced hairpin-like members attached to and extending downward from said vertically movable member a relatively large vertical distance in spaced vertical planes on opposite sides of said substantially vertical position occupied by said glass sheet and a pair of vertical walls attached to and extending downward from said vertically movable member a relatively small vertical distance.

References Cited by the Examiner

UNITED STATES PATENTS

| 2,247,289 | 6/1941 | Despret | 65—114 |
| 2,263,005 | 11/1941 | McClure | 65—287 X |
| 3,062,520 | 11/1962 | Frey et al. | 65—182 X |

FOREIGN PATENTS 1,210,865　10/1959　France.

DONALL H. SYLVESTER, *Primary Examiner.*